(12) United States Patent
Yamasaki

(10) Patent No.: US 12,141,997 B2
(45) Date of Patent: Nov. 12, 2024

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Mari Yamasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 341 days.

(21) Appl. No.: 17/667,388

(22) Filed: Feb. 8, 2022

(65) Prior Publication Data

US 2022/0262031 A1 Aug. 18, 2022

(30) Foreign Application Priority Data

Feb. 12, 2021 (JP) ................. 2021-020679

(51) Int. Cl.
*G06F 3/01* (2006.01)
*G06T 7/11* (2017.01)
*G06T 7/70* (2017.01)
*G06V 10/22* (2022.01)
*G06V 10/25* (2022.01)

(52) U.S. Cl.
CPC ............... *G06T 7/70* (2017.01); *G06T 7/11* (2017.01); *G06V 10/22* (2022.01); *G06V 10/25* (2022.01); G06T 2207/20021 (2013.01); G06T 2207/20092 (2013.01); G06T 2207/30196 (2013.01); G06T 2207/30242 (2013.01)

(58) Field of Classification Search
CPC ...... G16H 30/40; G16H 50/30; A61B 5/7275; A61B 5/4872; G06T 7/0012; G06T 7/70; G06T 7/11; G06F 16/9577; G06V 10/22; G06V 10/25
See application file for complete search history.

(56) References Cited

U.S. PATENT DOCUMENTS

2018/0059264 A1* 3/2018 Zhang ................ G06T 7/136
2021/0216827 A1* 7/2021 Hayaishi ............. G06V 10/26

FOREIGN PATENT DOCUMENTS

JP 2010086429 A 4/2010

* cited by examiner

*Primary Examiner* — Phuoc H Doan
(74) *Attorney, Agent, or Firm* — Canon U.S.A., Inc. IP Division

(57) ABSTRACT

An information processing apparatus acquires, from each of a plurality of partial regions obtained by dividing an input image, likelihood information indicating a likelihood indicating certainty of presence of a particular object, based on the likelihood information, determines a region where the likelihood is greater than or equal to a first predetermined value among the plurality of partial regions, as a region where a threshold is to be adjusted to be lower, and estimates a number of particular objects by counting the likelihood with respect to each of the partial regions by excluding a likelihood less than the threshold among the likelihoods included in the partial regions from counting targets.

17 Claims, 10 Drawing Sheets

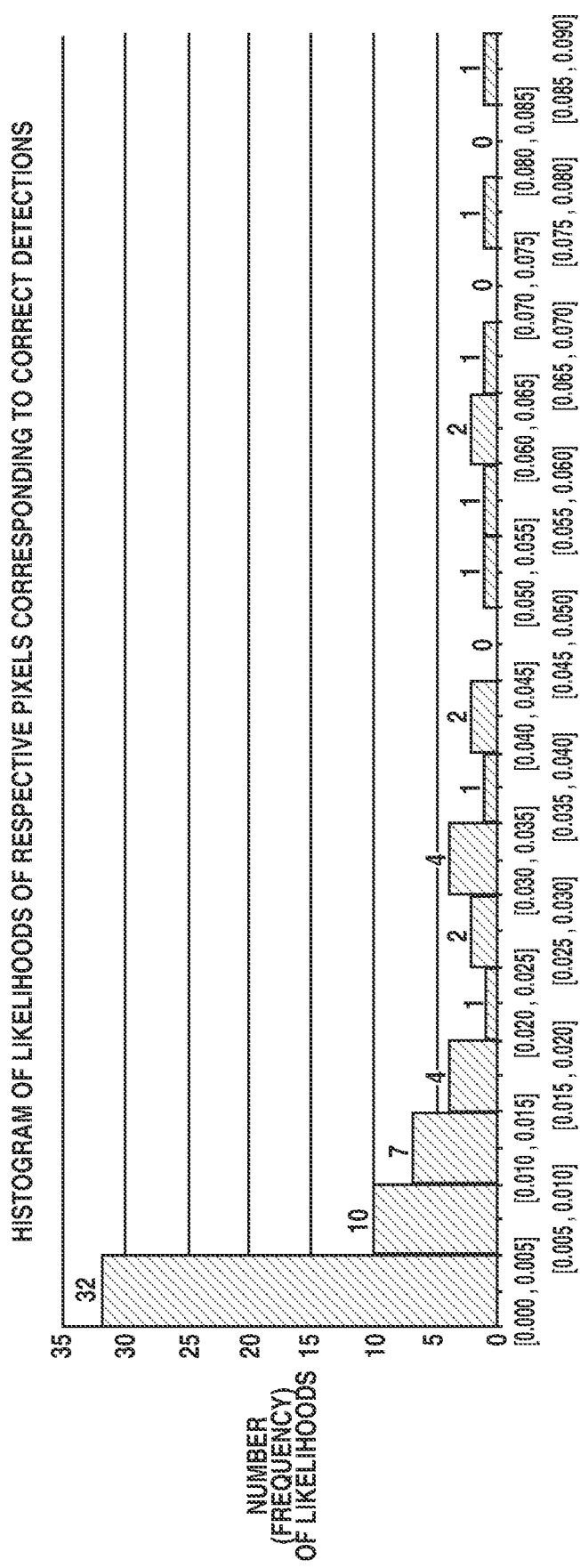

INFORMATION PROCESSING APPARATUS, INFORMATION PROCESSING METHOD, AND STORAGE MEDIUM

BACKGROUND OF THE DISCLOSURE

Field of the Disclosure

The present disclosure relates to a technique for detecting a particular object from an image.

Description of the Related Art

Japanese Patent Application Laid-Open No. 2010-86429 discusses a technique regarding the setting of a threshold for likelihoods in face region detection corresponding to an image capturing scene. For example, in a case where the number of measurement target objects is guessed using only likelihoods, the counting is performed based on all the likelihoods including even likelihoods indicating low certainties, and therefore, the likelihoods indicating low certainties are excluded from the counting targets using a threshold.

SUMMARY OF THE DISCLOSURE

According to an aspect of the present disclosure, an information processing apparatus includes an acquisition unit configured to acquire, from each of a plurality of partial regions obtained by dividing an input image, likelihood information indicating a likelihood indicating certainty of presence of a particular object, a determination unit configured to, based on the likelihood information, determine a region where the likelihood is greater than or equal to a first predetermined value among the plurality of partial regions, as a region where a threshold is to be adjusted to be lower, and an estimation unit configured to estimate a number of particular objects by counting the likelihood with respect to each of the partial regions by excluding a likelihood less than the threshold among the likelihoods included in the partial regions from counting targets.

Further features of the present disclosure will become apparent from the following description of exemplary embodiments with reference to the attached drawings.

BRIEF DESCRIPTION OF THE DRAWINGS

FIG. 6 is a diagram illustrating an example of a histogram of likelihood values of respective pixels corresponding to correct detections.

DESCRIPTION OF THE EMBODIMENTS

Figure 1:
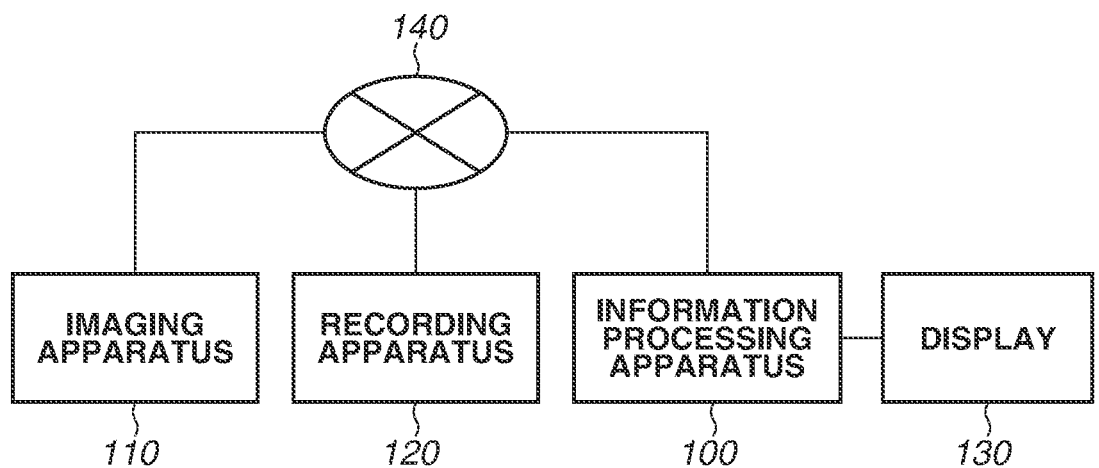
FIG. 1 is a diagram illustrating an example of a configuration of a system to which an information processing apparatus is applied.

With reference to the drawings, exemplary embodiments will be described below. The configurations illustrated in the following exemplary embodiments are merely examples, and are not limited to the configurations illustrated in the drawings.

There are increasing cases where an image captured by a monitoring camera or an image captured by the monitoring camera and then stored in a storage device is analyzed and utilized. For example, there is an image analysis system that defines a particular object such as a human body or a head present in an image as a counting target object, estimates likelihoods indicating the certainties of particular objects, and based on the estimated likelihoods, estimates the approximate number of counting target objects included in the image. In the present exemplary embodiment, when target objects in an image are counted, a threshold for counting the target objects is changed with respect to each region, thereby preventing the situation where a counting target object is not detected or is incorrectly detected, and improving the detection accuracy. FIG. 1 is a diagram illustrating an example of the configuration of a system to which an information processing apparatus 100 according to the present exemplary embodiment is applied. The system according to the present exemplary embodiment includes an information processing apparatus 100, an imaging apparatus 110, a recording apparatus 120, and a display 130. The information processing apparatus 100, the imaging apparatus 110, and the recording apparatus 120 are connected to each other via a network 140.

The network 140 is achieved by a plurality of routers, switches, and cables compliant with a communication standard such as Ethernet®. The network 140 may be achieved by the Internet, a wired local area network (LAN), a wireless LAN, or a wide area network (WAN).

The imaging apparatus 110 is an apparatus that captures an image of an object. In the present exemplary embodiment, a monitoring camera is taken as an example of the imaging apparatus 110, and a particular object such as a human body or a head appearing in an image captured by the monitoring camera is a target object of estimation and measurement (hereinafter, a "measurement target object") according to the present exemplary embodiment. The imaging apparatus 110 transmits data on an image acquired by capturing the image, information regarding the image capturing date and time when the image is captured, and identification information that is information identifying the imaging apparatus 110, in association with each other to an external apparatus such as the information processing apparatus 100 or the recording apparatus 120 via the network 140. Hereinafter, the data on the image captured by the imaging apparatus 110 will be referred to simply as an "image", and the image capturing date and time of the image and the identification information will be referred to as "related information". The system according to the present exemplary embodiment includes a single imaging apparatus 110, but may include a plurality of imaging apparatuses 110. That is, the plurality of imaging apparatuses 110 may be connected to the information processing apparatus 100 or the recording apparatus 120 via the network 140. In this case, using identification information included in related information regarding an image transmitted from any of the imaging apparatuses 110, the information processing apparatus 100 or the recording apparatus 120 determines which of the plurality of imaging apparatuses 110 has captured the transmitted image.

The recording apparatus 120 records the image captured by the imaging apparatus 110 and the related information in association with each other. Then, according to a request from the information processing apparatus 100, the recording apparatus 120 transmits the recorded information (the image and the related information) to the information processing apparatus 100.

Hereinafter, the image transmitted from the imaging apparatus 110 or the recording apparatus 120 and input to the information processing apparatus 100 will appropriately be referred to as an "input image".

Based on the input image sent from the imaging apparatus 110 or the recording apparatus 120, the information processing apparatus 100 estimates likelihoods indicating the certainties of particular objects, acquires likelihood information representing the likelihood, and estimates the number of particular objects based on the likelihoods. Based on the likelihood information, the information processing apparatus 100 also generates partial regions for adjusting a threshold for the likelihoods. Further, if there are a certain number or more of high likelihoods greater than or equal to a predetermined value in any of the partial regions for adjusting the threshold, the information processing apparatus 100 determines the partial region as a region where the threshold is to be adjusted to be lower. Then, the information processing apparatus 100 determines a likelihood less than the threshold determined in the partial region, as a likelihood that is not included in measurement targets for particular objects. Then, the information processing apparatus 100 excludes the determined likelihood and counts the number of particular objects. The predetermined value as a comparison target used to determine whether the likelihood is high may be a value determined in advance (e.g., 0.02), or a value further relatively adjusted from the predetermined value according to the estimation result (a value relatively adjusted to be greater than or equal to 0.02, for example, according to the estimation result) may be used. The details of the configuration of and information processing performed by the information processing apparatus 100 according to the present exemplary embodiment will be described below.

The display 130 is composed of a liquid crystal display (LCD) and displays the result of the information processing performed by the information processing apparatus 100 and the image captured by the imaging apparatus 110. The display 130 is connected to the information processing apparatus 100 via a display cable compliant with a communication standard such as High-Definition Multimedia Interface (HDMI)®. At least any one or all of the display 130, the information processing apparatus 100, and the recording apparatus 120 may be provided in a single housing. The result of the information processing performed by the information processing apparatus 100 and the image captured by the imaging apparatus 110 are displayed on not only the display 130 but also a display included in the following external apparatus, for example. The result of the image processing performed by the image processing apparatus 100 and the image captured by the imaging apparatus 110 may be displayed on a display included in a mobile device such as a smartphone or a tablet terminal connected via the network 140.

Figure 2:
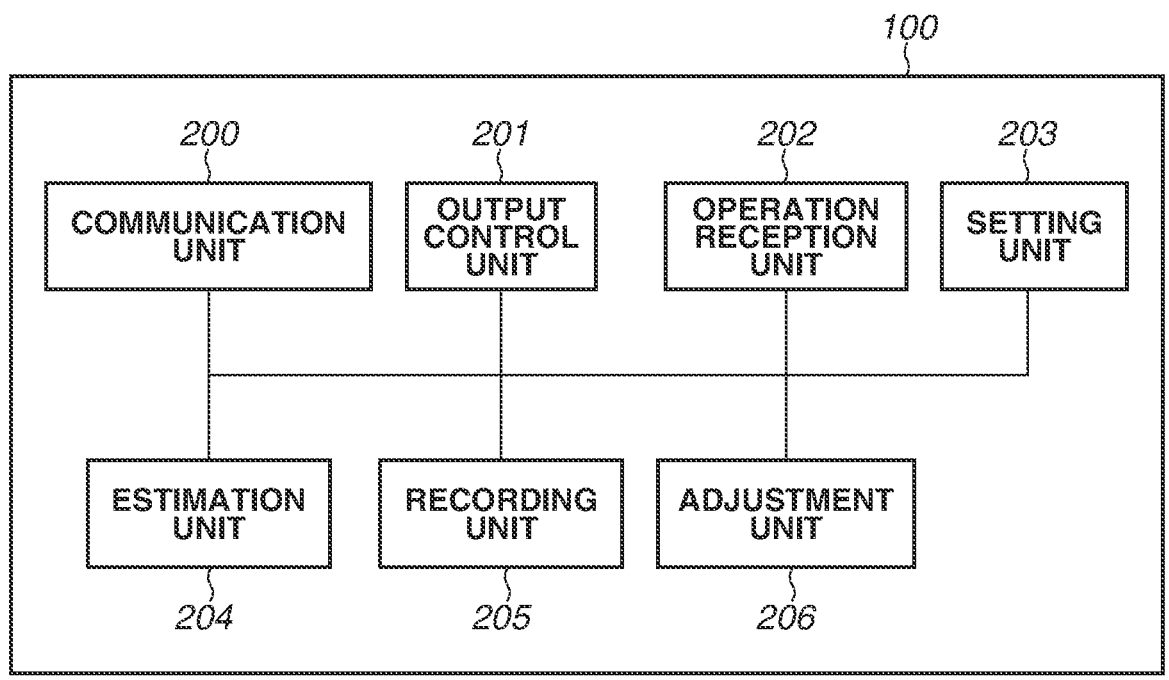
FIG. 2 is a diagram illustrating examples of functional blocks of the information processing apparatus.

Next, FIG. 2 is a diagram illustrating examples of the functional blocks of the information processing apparatus 100 according to the present exemplary embodiment. With reference to the functional blocks illustrated in FIG. 2, the information processing performed by the information processing apparatus 100 according to the present exemplary embodiment is described below. In the following description, an example is taken where functional units illustrated in the functional blocks in FIG. 2 are achieved, for example, by a personal computer executing an information processing program according to the present exemplary embodiment. That is, the functional units in FIG. 2 are achieved by a central processing unit (CPU) of a personal computer executing a computer program stored in a read-only memory (ROM). The hardware configuration of the personal computer for achieving functions related to the information processing apparatus 100 according to the present exemplary embodiment will be described below with reference to FIG. 10.

A communication unit 200 communicates with the imaging apparatus 110 and the recording apparatus 120 via an interface (I/F) 1040 in FIG. 10 described below. For example, the communication unit 200 receives an input image such as a moving image or a still image captured by the imaging apparatus 110 or a moving image or a still image recorded in the recording apparatus 120, and related information regarding the input image. The moving image includes images of a plurality of frames having temporal continuity (or relevance). The communication unit 200 acquires at least one of the images of the plurality of frames included in the moving image or the still image as a processing target image. The communication unit 200 also transmits a control command for controlling the imaging apparatus 110 to the imaging apparatus 110 or transmits a control command for controlling the recording apparatus 120 to the recording apparatus 120. The control command to the imaging apparatus 110 includes, for example, a command to instruct the imaging apparatus 110 to capture an image. The control command to the recording apparatus 120 includes a command to instruct the recording apparatus 120 to read an image from the recording apparatus 120.

An output control unit 201 outputs the input image, a setting screen for making settings regarding the information processing according to the present exemplary embodiment, and information indicating the result of the information processing performed by the information processing apparatus 100 to an external apparatus or displays the input image, the setting screen, and the information on the display 130. Examples of the external apparatus to which the output control unit 201 outputs the information include another information processing apparatus (not illustrated) and the recording apparatus 120.

An operation reception unit 202 receives an operation performed by a user through input devices (not illustrated) such as a keyboard, a mouse, and a touch panel.

A setting unit 203 sets a plurality of partial regions (first partial regions) as targets of an estimation process for estimating the number of particular objects in the input image. The first partial regions are counting target regions where the numbers of particular objects estimated from the image by an estimation unit 204 described below are counted in total. For example, the first partial regions are regions set by the setting unit 203 based on positions specified on the input image by the user through the operation reception unit 202. Specifically, the first partial regions are partial images (batches) obtained by dividing the input image to input the input image to a regressor in a regression-based estimation method. In the present exemplary embodiment, for example, a case is assumed where the entire region of the input image is set as a predetermined region. For example, if there is a region where a particular object is not present, a part of the input image may be set as the predetermined region.

The setting unit 203 also arranges and sets the plurality of partial regions as the targets of the estimation process for estimating the number of particular objects by the estimation unit 204 to cover the predetermined region. At this time, based on information regarding a size that can be adopted by a particular object at each of a plurality of different points on the input image and positions, the setting unit 203 sets the size and the position of each of the plurality of partial regions. The details of examples of the settings of the plurality of partial regions set in the predetermined region in the input image and the sizes and the positions of the plurality of partial regions will be described below. For example, the setting unit 203 may set regions specified by the user through the operation reception unit 202 as the partial regions as the targets of the estimation process for estimating the number of particular objects.

The setting unit 203 sets a threshold as a comparison target used to determine whether a likelihood as the estimation result obtained by the estimation unit 204 estimating a particular object is to be included in likelihoods as counting targets. In the present exemplary embodiment, in the process of estimating the number of particular objects, two processes, namely the process of estimating likelihoods indicating the certainties of particular objects included in the input image (an object estimation process) and the process of estimating the number of particular objects included in the input image by comparing the estimated likelihoods and the threshold (a number estimation process), are performed. The "threshold" as used herein is a threshold for determining whether the estimation result of a particular object is valid in the number estimation process. Specifically, the threshold is set to a predetermined value such as 0.05. In the number estimation process, a likelihood less than the threshold (or less than or equal to the threshold) is excluded from the counting targets. The details of the threshold for the likelihoods will be described below.

The estimation unit 204 executes the estimation process for estimating the number of particular objects in each of the plurality of partial regions (the first partial regions) set in the predetermined region in the input image by the setting unit 203. In the present exemplary embodiment, an example is assumed where the estimation unit 204 uses, for example, a regression-based estimation method as a technique for estimating the number of particular objects (the number estimation process). In the regression-based estimation method, using a regressor (a trained recognition model) to which a small image of a certain fixed size s is input and from which the number of particular objects present in the small image is output, the number of particular objects in each of the plurality of partial regions in the predetermined region in the input image is estimated. When the regressor is trained, many small images of the fixed size s in which the position of a particular object is known are prepared, and the regressor is trained in advance on these target small images as training data based on a machine learning technique. At this time, to improve the accuracy of estimating the number of particular objects, it is desirable that the ratio between the size (the fixed size s) of each small image as the training data and the size of the particular object present in the small image should be approximately constant. Then, the estimation unit 204 generates a small image by resizing an image of each of the plurality of partial regions set in the predetermined region in the input image to the fixed size s and inputs the generated small image to the regressor, thereby obtaining "the position and the likelihood (the estimated value) of the particular object in the partial region" as an output from the regressor. Then, the estimation unit 204 obtains the sum total value of the likelihoods of particular objects estimated in the partial region, as the number (the estimated number) of particular objects in the partial region (the number estimation process). Each of the likelihoods is compared with the threshold, whereby it is possible to exclude estimation results as noise. In the present exemplary embodiment, the total value of the likelihoods except the estimation results as noise is output as the estimation result of the final number. In the following description, a person is taken as an example of the particular object. The present disclosure, however, is not limited to this. The particular object may be a part of a human body, such as the head, the upper body, the arm, or the foot of a person, or may be another object such as an automobile or a license plate.

A recording unit 205 stores information related to the information processing performed by the information processing apparatus 100 and data on an image. For example, the recording unit 205 records the number of particular objects acquired by the estimation process performed by the estimation unit 204 on each of the plurality of partial regions set in the predetermined region in the input image. The recording unit 205 also records likelihood information that is information acquired by the estimation process performed by the estimation unit 204. In the present exemplary embodiment, the likelihood information is held in the recording unit 205 of the information processing apparatus 100. The present disclosure, however, is not limited to this. For example, the likelihood information may be held in an external apparatus (e.g., the recording apparatus 120) connected to the information processing apparatus 100 via the network 140. In a case where the likelihood information is held in the external apparatus, the communication unit 200 of the information processing apparatus 100 may transmit a command requesting the likelihood information to the external apparatus and acquire the likelihood information transmitted from the external apparatus according to the command.

An adjustment unit 206 acquires the values of the likelihoods and the positions of the likelihoods as the likelihood information regarding the estimation result obtained by the estimation unit 204. Based on the likelihood information obtained by the estimation unit 204, the adjustment unit 206 sets a region that is the same as a partial region to be input to the regressor in the regression-based estimation method, or joins a plurality of partial regions, thereby generating partial regions of interest for adjusting the threshold (second partial regions). The second partial regions may be regions that are the same as the first partial regions, or may be generated by integrating any of the first partial regions including similar likelihoods based on the likelihood information. Further, the adjustment unit 206 compares the total of the likelihoods in each of the second partial regions and a first predetermined value. Then, the adjustment unit 206 determines a partial region where the total of the likelihoods is greater than the first predetermined value, as a region where the threshold for the number estimation process is decreased. For example, if the total value of the likelihoods included in a certain partial region is 5.4 and the first predetermined value is 5, 5.4>5. Thus, the partial region is determined as a target region where the threshold is to be decreased.

The adjustment unit 206 determines a partial region where the total of the likelihoods is smaller than the first predetermined value, as a region where the process of comparing each of the likelihoods included in the partial region and the threshold is to be performed in the number estimation process. If there are a certain number or more of high likelihoods greater than or equal to a second predetermined value in any of the partial regions, the adjustment unit 206 may perform a threshold adjustment process for lowering the threshold for the likelihoods in the partial region, or a threshold adjustment process for eliminating (not setting) the threshold for the likelihoods in the partial region. For example, in a case where the likelihoods included in a certain partial region are (0.8, 0.8, 0.7, 0.5, 0.3, 0.01), the adjustment unit 206 compares each of the likelihoods and the second predetermined value (e.g., 0.1). If the number of likelihoods greater than the second predetermined value is a certain number (e.g., greater than or equal to four), the adjustment unit 206 determines the partial region as a region where the threshold is to be adjusted. In the partial region in this specific example, there are five likelihoods greater than 0.1, and the number of likelihoods satisfying the condition is 5>4. Thus, the adjustment unit 206 determines the partial region as a region where the threshold is to be adjusted. Then, the adjustment unit 206 determines a likelihood less than the threshold as a likelihood that is not included in measurement targets for particular objects. Then, the adjustment unit 206 excludes the determined likelihood from the likelihoods estimated by the estimation unit 204 and calculates the number of particular objects. The details of these processes by the adjustment unit 206 will be described below.

Information indicating the estimated number of particular objects (e.g., the number of people) that is the sum total value of the likelihoods estimated by the estimation unit 204 and adjusted by the adjustment unit 206 as described above is output from the output control unit 201 to an external apparatus. The output control unit 201 displays the information regarding the estimated number of particular objects, information indicating the overall processing time of the adjustment unit 206, and information indicating the total frame processing time on the display 130, which is an example of the external apparatus.

As described above, the information processing apparatus 100 according to the present exemplary embodiment estimates particular objects (human bodies or heads) as measurement target objects present in the input image and acquires likelihoods indicating the certainties of the presence of the estimated particular objects. Based on the acquired likelihoods, the information processing apparatus 100 also creates the second partial regions. Further, if the total of the likelihoods in any of the second partial regions is greater than or equal to the first predetermined value, the information processing apparatus 100 adjusts the threshold for the likelihoods in the partial region to be lower or to be eliminated. Then, the information processing apparatus 100 determines a likelihood less than the threshold as a likelihood that is not included in counting targets for particular objects, excludes the determined likelihood from the counting targets, and counts likelihoods greater than or equal to the threshold, thereby estimating the number of particular objects.

Figure 3:
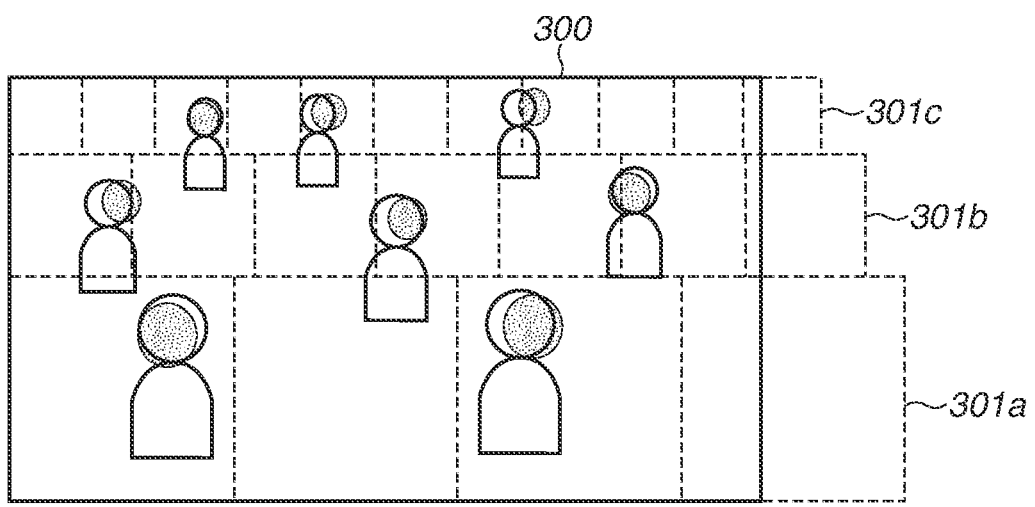
FIG. 3 is a diagram illustrating examples of a plurality of partial regions set in an input image.

Next, with reference to FIG. 3, a description is given of the process of setting the plurality of partial regions in the predetermined region in the input image. FIG. 3 is a diagram illustrating examples of the plurality of partial regions set by the setting unit 203 in the state where an image captured by the imaging apparatus 110 is the input image, and the entirety of the input image is the predetermined region.

As illustrated in FIG. 3, the setting unit 203 sets a plurality of partial regions 301a, 301b, and 301c in an image 300 input from the imaging apparatus 110. In the present exemplary embodiment, based on information regarding the size and the position of a person appearing at each of a plurality of different points on the image 300, the setting unit 203 sets the plurality of partial regions 301a, 301b, and 301c in the image 300. The size of each partial region in the image captured by the imaging apparatus 110 depends on the size of the particular object appearing in the captured image. In the example of FIG. 3, a human body (a person) is taken as an example of the particular object, and the size of each partial region depends on the size of the human body appearing in a different size according to the position in the captured image. For example, in a case where the imaging apparatus 110 is placed at a position where the imaging apparatus 110 looks down on a horizontal surface such as a floor surface, i.e., in a case where the imaging apparatus 110 is installed such that the optical axis of the lens is directed below the horizontal axis, the human body appears large in a lower portion of the captured image, and the human body appears small in an upper portion of the captured image. Thus, among the plurality of partial regions 301a, 301b, and 301c in the image 300, the sizes of the partial regions 301a disposed in a lower portion of the image 300 are larger than the sizes of the partial regions 301b and 301c disposed in portions above the partial regions 301a. Similarly, the sizes of the partial regions 301b disposed in a middle portion of the image 300 are larger than the sizes of the partial regions 301c disposed in a portion above the partial regions 301b. The closer to 90 degrees the angle between the optical axis of the lens of the imaging apparatus 110 and the horizontal axis is, the closer to an approximately uniform size the sizes of human bodies included in the captured image are regardless of the position in the captured image, and the smaller the difference in size between partial regions in an upper portion and a lower portion of the captured image is. In the example of FIG. 3, rectangular regions surrounded by dashed lines are the partial regions set by the setting unit 203. As a calculation parameter for determining the sizes of the partial regions as described above, an imaging parameter such as the installation position, the installation angle, or the zoom magnification of the imaging apparatus 110 may be used, or the size of a human body specified based on the captured image by the user may be used.

For example, in a case where the sizes of the partial regions are set based on specifying by the user, the setting unit 203 forms a graphical user interface (GUI) for the user to specify the sizes of the partial regions on the display 130 via the output control unit 201. Using the operation reception unit 202, the user specifies information regarding the size and the position of a person appearing at each of a plurality of different points in the predetermined region in the input image through the GUI. For example, if the user performs an operation for specifying the average size of people appearing at positions in each of an upper portion, a middle portion, and a lower portion on the image displayed on the GUI, the operation reception unit 202 receives this specifying by the user. Then, the recording unit 205 records information regarding the positions of the people based on the specifying of the average size at the positions in each of the upper portion, the middle portion, and the lower portion that is received by the operation reception unit 202, and information regarding the average size of the people appearing at these positions. Then, the setting unit 203 acquires the information regarding the positions of the people in each of the upper portion, the middle portion, and the lower portion of the image and the information regarding the average size of the people at these positions that are recorded in the recording unit 205.

The information regarding the size and the position of the person appearing at each of the plurality of different points may be acquired by performing image analysis on an image captured in advance by the imaging apparatus 110. For example, the setting unit 203 executes the process of detecting a person using pattern matching on an image captured in advance by the imaging apparatus 110, and the recording unit 205 records information associating the position of the person detected from the image with the size of the person at this position. The setting unit 203 acquires the information regarding the position and the size of the person at each of the plurality of different points detected from the image and recorded in the recording unit 205 as described above from the recording unit 205.

Then, based on the position of the person corresponding to each of the plurality of different points on the image acquired by the specifying by the user or the image analysis, and the size of the person appearing at this position, the setting unit 203 estimates size information f(x,y) regarding the person appearing at any position on the image. The size information f(x,y) regarding the person at any position on the image indicates the average size of the person appearing at the coordinates (x, y) of any position on the image. It is assumed that the size information f(x,y) can be represented, for example, by x that indicates an x-coordinate on the image, y that indicates a y-coordinate on the image, and one or more parameters. For example, it is assumed that f(x,y) =ax+by+c. In this example, unknown parameters are a, b, and c. At this time, using the information read from the recording unit 205 and regarding the position and the size of the person at each of the plurality of different points on the image, the setting unit 203 can obtain the unknown parameters by statistical processing such as the method of least squares.

Then, based on the size information f(x,y) regarding the size of the person at any position on the image, the setting unit 203 sets the plurality of partial regions in the image (the predetermined region in the input image). In the example illustrated in FIG. 3, as the size of the person at any position on the image 300, the size of the person is approximately the same in the horizontal direction of the image 300. The size of the person becomes smaller from the lower portion to the upper portion in the vertical direction of the image 300. In the example of FIG. 3, first, the setting unit 203 sets the plurality of partial regions 301a along a lower end of the image 300. At this time, the setting unit 203 sets the partial regions 301a such that the ratio between the size (a size a) of each partial region 301a and the size of the person indicated by the size information f(x,y) at the coordinates of the lower end in the partial region 301a is approximately the same as a ratio r corresponding to training data.

Next, the setting unit 203 sets the plurality of partial regions 301b along an upper end of the plurality of partial regions 301a. At this time, the setting unit 203 sets the partial regions 301b such that the ratio between the size (a size b) of each partial region 301b and the size of the person indicated by the size information f(x,y) at the coordinates of the lower end in the partial region 301b is approximately the same as the ratio r corresponding to the training data.

Further, the setting unit 203 sets the plurality of partial regions 301c along an upper end of the plurality of partial regions 301b. At this time, the setting unit 203 sets the partial regions 301c such that the ratio between the size (a size c) of each partial region 301c and the size of the person indicated by the size information f(x,y) at the coordinates of the lower end in the partial region 301c is approximately the same as the ratio r corresponding to the training data.

As described above, the setting unit 203 according to the present exemplary embodiment sets partial regions in an image such that the ratio between the size of each partial region and the size of the particular object such as a person in the partial region is approximately the same as the ratio r between the size of a small image as training data and the size of the particular object appearing in the small image. That is, in the present exemplary embodiment, the partial regions are set in the image to come close to the environment of the training data, whereby it is possible to further enhance the accuracy of estimating the number of particular objects included in the partial regions. In the above description given with reference to FIG. 3, the partial regions are set in order from the lower end to the upper end of the image. The present disclosure, however, is not limited to this. Alternatively, the partial regions may be set from another position.

Figure 4:
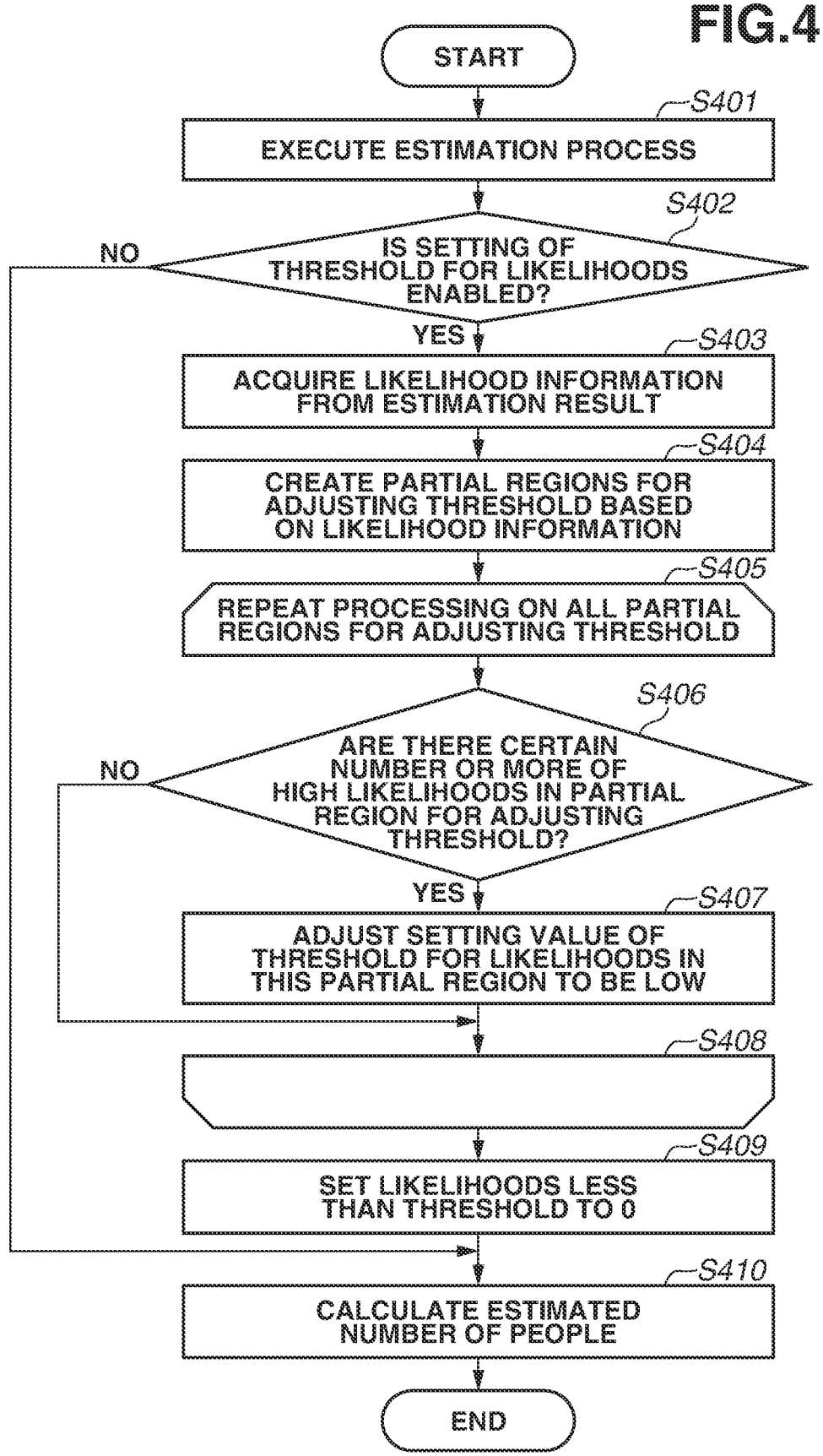
FIG. 4 is a flowchart of information processing executed by the information processing apparatus.

Next, with reference to a flowchart illustrated in FIG. 4, a description is given of the flow of the information processing executed by the information processing apparatus 100 according to the present exemplary embodiment. By executing the processing in FIG. 4, then based on likelihood information regarding the result of performing an estimation process on an put image, the information processing apparatus 100 can prevent an object that is not a measurement target from being incorrectly detected, and also prevent a decrease in likelihoods corresponding to correct detections. That is, in the present exemplary embodiment, it is possible to reduce estimation results indicating low likelihoods that are highly likely to correspond to incorrect detections, and also prevent the situation where likelihoods corresponding to correct detections that are highly likely to be correct estimation results are not counted. (prevent a decrease in the number of likelihoods corresponding to correct detections).

The processing illustrated in FIG. 4 may be executed, for example, according to a user instruction in a setting mode where the threshold for the likelihoods is set in an image captured by the imaging apparatus 110. Alternatively, the processing in FIG. 4 may be automatically executed, for example, when the setting of the threshold for the likelihoods is enabled in an image captured by the imaging apparatus 110. The processing in FIG. 4 is executed, for example, by the functional blocks illustrated in FIG. 2, which are achieved by the CPU executing the computer program stored in the ROM.

First, in step S401, based on a trained model that estimates the presence of a particular object in an input image, the estimation unit 204 acquires likelihood information including the positions and the likelihoods of particular objects. That is, the estimation unit 204 executes the above estimation process for estimating particular objects (people or heads) and estimating the number of particular objects. The estimation unit 204 inputs each of a plurality of partial regions (first partial regions) obtained by dividing the input image to the trained model, thereby acquiring the likelihoods of particular objects included in each of the partial regions.

The likelihoods take a value between 0 (absent) to 1 (present). In this step, the estimation unit 204 acquires as likelihood information the positions of the heads of people as particular objects and the likelihoods of the heads.

Next, in step S402, the adjustment unit 206 determines whether the setting of the threshold for the likelihoods by the setting unit 203 is enabled. If the adjustment unit 206 determines that the setting of the threshold for the likelihoods is enabled (Yes in step S402), the processing proceeds to step S403. If, on the other hand, the adjustment unit 206 determines that the setting of the threshold for the likelihoods is disabled (No in step S402), the processing proceeds to step S410.

In step S403, the adjustment unit 206 acquires information regarding the estimation result obtained by the estimation unit 204, i.e., likelihood information specifying the likelihood indicating the certainty of the presence of a particular object. In this step, for example, the adjustment unit 206 acquires, as the likelihood information, position information regarding positions in the image and the values of the likelihoods corresponding to the position information regarding these positions.

Next, in step S404, based on the likelihood information acquired from the estimation unit 204 in step S403, the adjustment unit 206 generates partial regions for adjusting the threshold (second partial regions). The details of a creation process for creating the partial regions for adjusting the threshold based on the likelihood information will be described below.

Next, the adjustment unit 206 repeats loop processing from step S405 to step S408 on each of all the partial regions for adjusting the threshold that are created in step S404. In steps S405 to S408, the adjustment unit 206 determines whether there are a certain number or more of likelihoods greater than or equal to the predetermined value in each of the partial regions for adjusting the threshold. If there are a certain number or more of likelihoods, the adjustment unit 206 performs the process of determining the partial region as a region where the threshold in the partial region is to be adjusted to be lower, or the threshold is not to be set.

That is, in step S406 in the loop processing in steps S405 to S408, the adjustment unit 206 determines whether there are a certain number or more of high likelihoods greater than or equal to the predetermined value in each of the partial regions for adjusting the threshold. If there are a certain number or more of high likelihoods in the partial region for adjusting the threshold (Yes in step S406), the adjustment unit 206 determines that it is highly likely that there are counting target objects, it is highly likely that there are likelihoods corresponding to correct detections. Then, the processing proceeds to step S407. If, on the other hand, there are not a certain number or more of likelihoods greater than or equal to the predetermined value in the partial region for adjusting the threshold (No in step S406), the adjustment unit 206 determines that it is unlikely that there are counting target objects, it is highly likely that there are likelihoods corresponding to incorrect detections. Then, the processing proceeds to step S408.

In step S407, the adjustment unit 206 adjusts the threshold for the likelihoods set by the setting unit 203 to be lower in the partial region for adjusting the threshold. In step S407, the adjustment unit 206 may make adjustment to set the threshold for the likelihoods to 0, i.e., not to set the threshold, in the partial region for adjusting the threshold. In step 408, the adjustment unit 206 determines whether threshold adjustment processing has been performed for all the partial areas. When the processing is completed for all the partial areas, the process proceeds to step 409, otherwise, the process returns to step 405 for loop processing. Then, if the loop processing in steps S405 to S408 is performed on all the partial regions for adjusting the threshold that are created in step S404, the processing proceeds to step S409.

In step S409, the adjustment unit 206 updates likelihoods less than the threshold adjusted with respect to each of the partial regions for adjusting the threshold to 0. Consequently, the likelihoods less than the threshold are removed from counting targets. After step S409, the processing of the information processing apparatus 100 proceeds to step S410, which is performed by the estimation unit 204.

In step S410, based on the likelihoods after the update in step S409, the estimation unit 204 estimates the number of particular objects. That is, the estimation unit 204 performs the process of counting the likelihoods after the update in step S409, thereby calculating the number of particular objects (the estimated number of people).

Figure 5A:
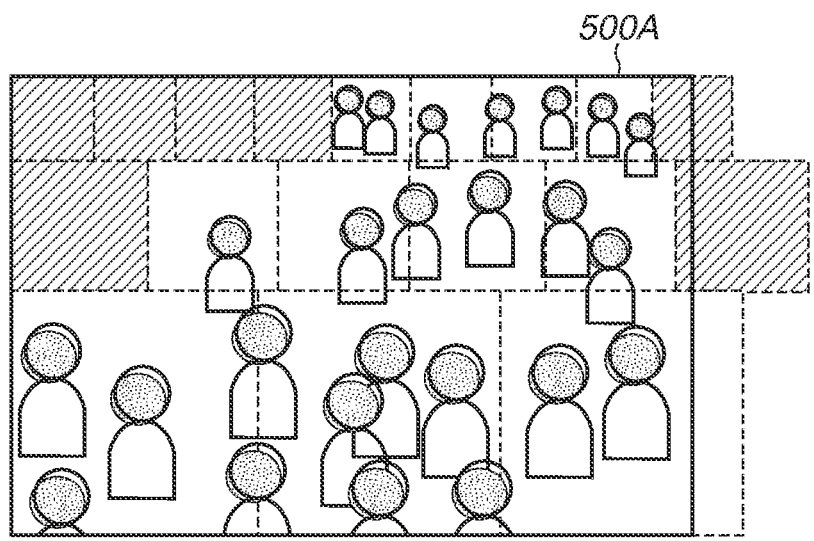
FIGS. 5A to 5C are diagrams illustrating examples of partial regions for adjusting a threshold for likelihoods.
Figure 5B:
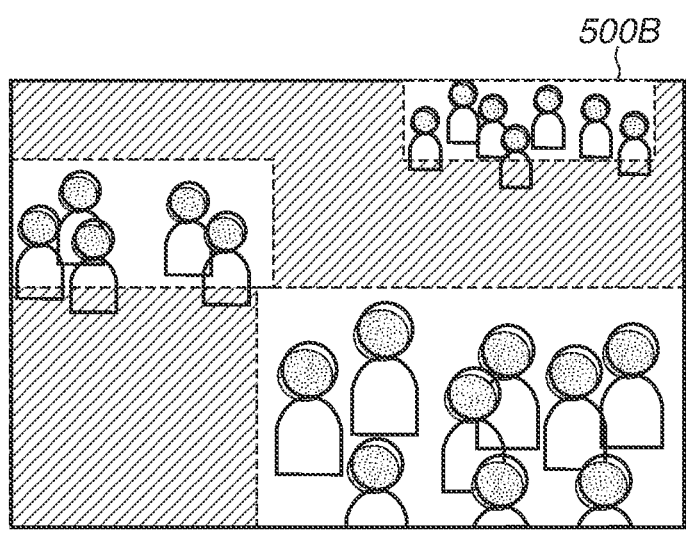
Figure 5C:
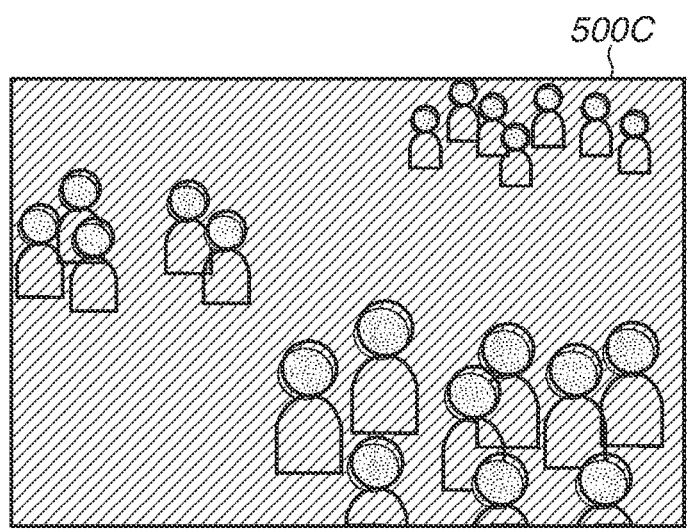

Next, with reference to FIGS. 5A to 5C, a description is given of the creation process for creating the partial regions for adjusting the threshold, which is performed by the adjustment unit 206 according to the present exemplary embodiment.

FIG. 5A is a diagram illustrating an example where partial regions to be input to the regressor when the estimation unit 204 performs the estimation process are created as partial regions for adjusting the threshold. In an image 500A in FIG. 5A, partial regions for adjusting the threshold that are indicated by shaded portions are regions where the threshold for the likelihoods is not to be adjusted to be lower, and partial regions that are not indicated by shaded portions are regions where the threshold for the likelihoods is to be adjusted to be lower.

FIG. 5B is a diagram illustrating an example where a group is created with respect to each partial region where a plurality of likelihoods greater than or equal to the predetermined value is densely distributed, and partial regions for adjusting the threshold are created in group units. The adjustment unit 206 determines a group based on the distances between high likelihoods greater than or equal to the predetermined value. In an image 500B in FIG. 5B, partial regions for adjusting the threshold that are indicated by shaded portions are regions where the threshold is not to be adjusted to be lower, and regions that are not indicated by shaded portions are regions created for groups for which the threshold for the likelihoods is to be adjusted to be lower.

FIG. 5C is a diagram illustrating an example where partial regions for adjusting the threshold are created in cluster units including likelihoods greater than or equal to the predetermined value. In an image 500C in FIG. 5C, partial regions for adjusting the threshold that are indicated by shaded portions are regions where the threshold is not to be adjusted to be lower, and regions that are not indicated by shaded portions are regions created in cluster units. Each cluster unit may be a set of likelihoods at pixels continuous with each other, or may be a set of likelihoods present at pixels in a certain range about a high likelihood greater than or equal to the predetermined value.

The partial regions for adjusting the threshold may be created in the entirety of the screen.

In the case of a moving image, if the estimation result changes between frames, the adjustment unit 206 may create partial regions for adjusting the threshold again.

The adjustment unit 206 may also determine a part of a partial region for adjusting the threshold where there is not a likelihood greater than or equal to the predetermined value, as a region where the threshold is to be set to be higher.

As described above, in the first exemplary embodiment, based on likelihood information estimated from an input image, a threshold is adjusted to be lower in a partial region where it is highly likely that there is a correct detection. Consequently, it is possible to reduce estimated values corresponding to low likelihoods that are highly likely to correspond to incorrect detections, and also prevent a decrease in the number of likelihoods corresponding to correct detections. Thus, according to the present exemplary embodiment, it is possible to improve the counting accuracy of estimated particular objects.

A description is given using examples of specific values. For example, a case is assumed where the particular object is the head of a human body, and the predetermined value used to determine whether the likelihood is high is 0.02. Then, as the analysis result, there are many likelihoods greater than or equal to 0.02 as likelihoods corresponding to correctly detected heads, and on the other hand, there are very few incorrect detections corresponding to a set of low likelihoods. In this example, if there are a certain number or more (e.g., 100 or more) of likelihoods greater than or equal to 0.02 in the image, the threshold for the likelihoods is set to a lower value (e.g., 0.010). If, on the other hand, there are less than 100 likelihoods greater than or equal to 0.02, for example, the threshold for the likelihoods is set to a value higher than 0.01 (e.g., 0.015). Consequently, it is possible to reduce estimated values corresponding to low likelihoods that are highly likely to correspond to incorrect detections, and also prevent a decrease in likelihoods corresponding to correct detections.

As another example, a case is assumed where, as the analysis result, for example, likelihoods corresponding to correct detections include high likelihoods greater than or equal to 0.03 and less than 0.10, and likelihoods corresponding to incorrect detections include very few likelihoods exceeding 0.03. In this example, if there are a certain number or more (e.g., 100 or more) of likelihoods greater than or equal to 0.03 in the image, the threshold for the likelihoods is set to 0 (the same as the state where the threshold is not set), for example. If, on the other hand, there are 10 to 100 likelihoods greater than or equal to 0.03, for example, the threshold for the likelihoods is set to a lower value (e.g., 0.010). Consequently, it is possible to reduce estimated values corresponding to low likelihoods that are highly likely to correspond to incorrect detections, and also prevent a decrease in the number of likelihoods corresponding to correct detections.

Next, in a second exemplary embodiment, a description is given of an example of a threshold adjustment process for determining the threshold with respect to each of partial regions for adjusting the threshold according to the number of high likelihoods greater than or equal to the predetermined value. In the first exemplary embodiment, an example has been described where, depending on whether there are a certain number or more of likelihoods greater than or equal to the predetermined value, the threshold is adjusted to be lower or is eliminated. In contrast, in the second exemplary embodiment, a description is given of a threshold adjustment process for gradually adjusting the threshold for the likelihoods with respect to each of partial regions for adjusting the threshold according to the number of high likelihoods greater than or equal to the predetermined value. The configuration of a system and the functional blocks of an information processing apparatus 100 according to the second exemplary embodiment are similar to those described with reference to FIGS. 1 and 2 in the first exemplary embodiment, and therefore are not described.

FIG. 6 is a diagram illustrating an example of a histogram (a frequency distribution table) of the likelihood values of respective pixels corresponding to correct detections for a single person in a case where the particular object is a person, for example. In this case, a likelihood value of 0 is not included in the likelihood values of the respective pixels corresponding to correct detections. Thus, the number corresponding to a likelihood value of 0 is not included in the number of likelihoods in FIG. 6, either. For example, if the predetermined value used to determine whether the likelihood is high is greater than or equal to 0.02, 17 likelihood values are targets in the example of FIG. 6. In the second exemplary embodiment, the threshold is thus determined in a partial region for adjusting the threshold as a target according to the number of high likelihoods.

Figure 7:
FIG. 7 is a diagram illustrating a table of the threshold for the likelihoods according to the number of estimated values corresponding to high likelihoods.

FIG. 7 is a diagram illustrating a table 700 as an example where the threshold is determined with respect to each of partial regions for adjusting the threshold according to the number of high likelihoods greater than or equal to the predetermined value. From the example of FIG. 7, if the number of likelihoods greater than or equal to the predetermined value that are included in any of the partial regions for adjusting the threshold is 0, the adjustment unit 206 determines that it is highly likely that there are not correct detections. Then, the adjustment unit 206 adjusts the threshold for the likelihoods to be the highest. If the number of high likelihoods greater than or equal to the predetermined value is 1 to 100, the adjustment unit 206 adjusts the threshold to 0.01. If the number of high likelihoods is 101 to 200, the adjustment unit 206 adjusts the threshold to 0.005. If the number of high likelihoods is greater than or equal to 201, the adjustment unit 206 does not set the threshold (sets the threshold to 0).

Figure 8:
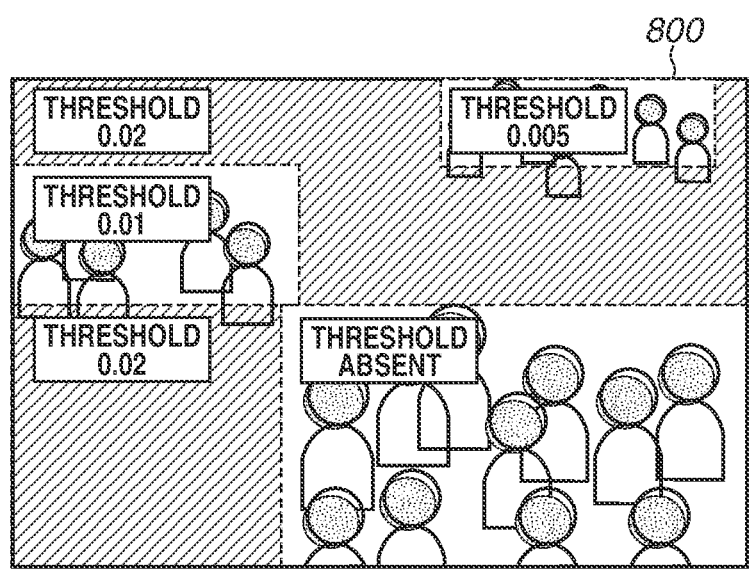
FIG. 8 is a diagram illustrating a process of setting the threshold for the likelihoods according to the number of estimated values corresponding to high likelihoods.

FIG. 8 is a diagram illustrating an example of the result of performing the threshold adjustment process for gradually determining the threshold for the likelihoods with respect to each of partial regions for adjusting the threshold according to the number of high likelihoods greater than or equal to the predetermined value, which has been described with reference to FIG. 7.

Based on the table 700 in FIG. 7, in an image 800 in FIG. 8, the threshold is 0.02 in regions indicated by shaded portions, whereas a region where the threshold is 0.01 illustrates a region where the number of likelihoods greater than or equal to the predetermined value is 1 to 100. In the image 800 in FIG. 8, a region where the threshold is 0.005 illustrates a region where the number of likelihoods greater than or equal to the predetermined value is 101 to 200, and a region where the threshold is not set illustrates a region where the number of likelihoods greater than or equal to the predetermined value is greater than or equal to 200.

Processing according to the second exemplary embodiment may be executed, for example, when the user enables the setting of the threshold for the likelihoods and selects an automatic adjustment. The automatic adjustment of the setting of the threshold for the likelihoods may be executed as a process for improving the detection accuracy in internal processing. In the case of a moving image, if the estimation result changes between frames, partial regions for adjusting the threshold may be automatically created again.

In the second exemplary embodiment, based on likelihood information in an image, a threshold is gradually adjusted to be lower according to the number of correct detections in a partial region where it is highly likely that there are likelihoods corresponding to correct detections. Consequently, the greater the number of high likelihoods greater than or equal to the predetermined value is, the greater the number of correct detections is, the greater the accumulated values of low likelihoods corresponding to correct detections are. According to the second exemplary embodiment, the threshold for the likelihoods is thus gradually determined, whereby it is possible to prevent a decrease in the number of likelihoods corresponding to correct detections from increasing as correct detections increase. Consequently, in the second exemplary embodiment, it is possible to set a locally appropriate threshold for the likelihoods and improve the counting accuracy of estimated particular objects.

Next, in a third exemplary embodiment, an example is described where in a case where the user specifies partial regions for adjusting the threshold for the likelihoods, using a GUI for setting the threshold for the likelihoods, the threshold for the likelihoods is set in each of the partial regions for adjusting the threshold. The configuration of a system and the functional blocks of an information processing apparatus 100 according to the third exemplary embodiment are similar to those described with reference to FIGS. 1 and 2. In the first exemplary embodiment, and therefore are not described.

Figure 9:
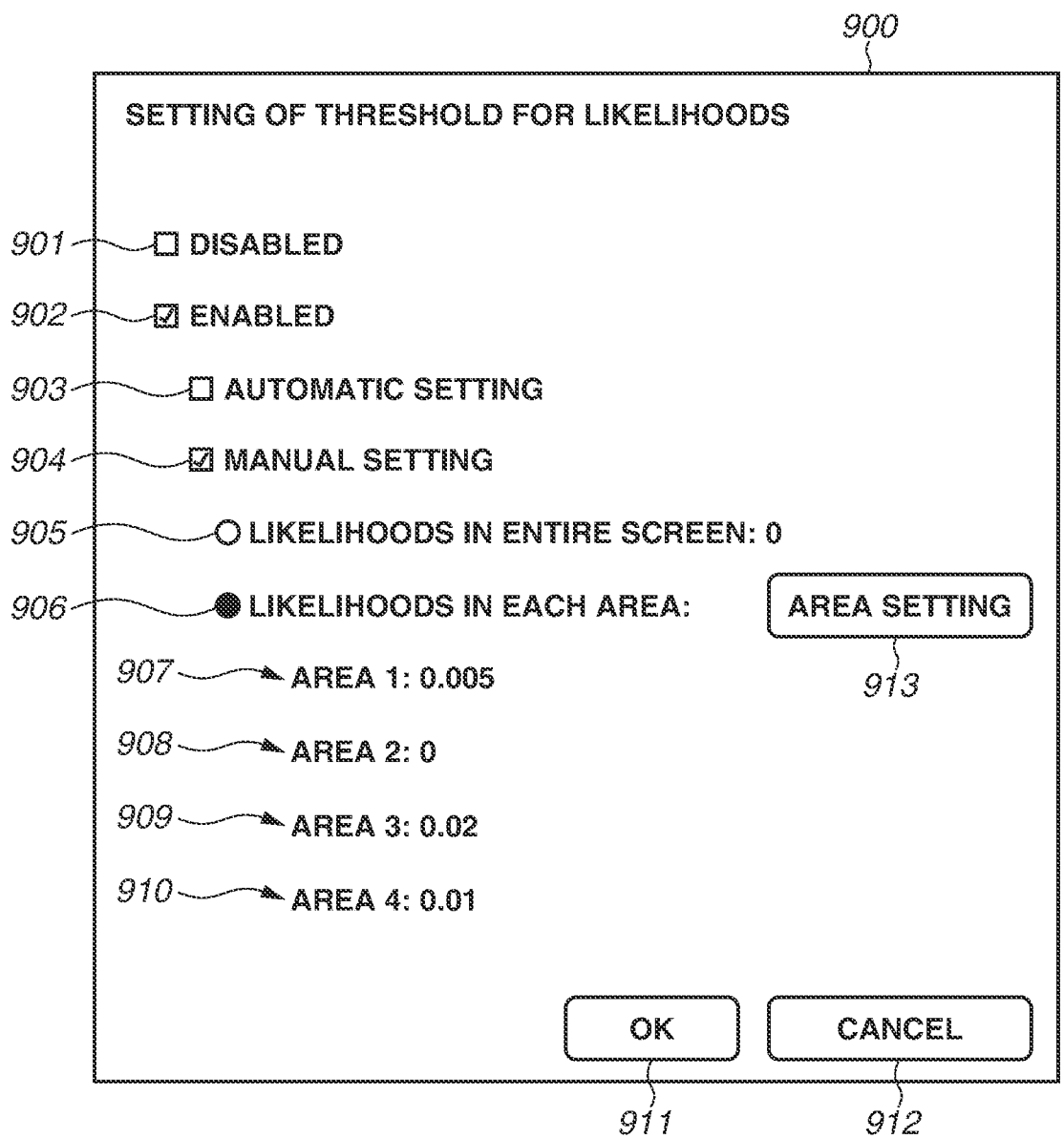
FIG. 9 is a diagram illustrating an example of a graphical user interface (GUI) used to set the threshold for the likelihoods.

FIG. 9 is a diagram illustrating an example of a GUI screen displayed on the display 130 via the output control unit 201 by the setting unit 203 in the third exemplary embodiment. Based on information set by the user through the GUI screen, the adjustment unit 206 sets the threshold for the likelihoods in each of the partial regions for adjusting the threshold.

A display screen 900 in FIG. 9 is a diagram illustrating an example of a GUI for setting the threshold for the likelihoods for the purpose of removing incorrect detections corresponding to low likelihoods. In an initial state and in a case where the user selects a checkbox 901 and further presses an OK button 911 on the display screen 900, the adjustment unit 206 does not set the threshold for the likelihoods. If the user selects a checkbox 902 and further presses the OK button 911 on the display screen 900, the adjustment unit 206 sets the threshold for the likelihoods. If the user selects the checkbox 902, a checkbox 903 is selected in the initial state. If the user selects the checkbox 903 and further presses the OK button 911, the setting unit 203 determines that the user gives an instruction to make an automatic determination. Then, the setting unit 203 automatically determines and sets the threshold for the likelihoods. If, on the other hand, the user selects a checkbox 904 and further presses the OK button 911, the setting unit 203 enables the user to select a radio button 905 or 906. Then, if the user selects the radio button 905, the adjustment unit 206 enables the user to specify the threshold for the likelihoods in the entirety of the screen. Consequently, it is possible to exclude a likelihood less than any threshold from counting targets in the entirety of the screen. If the user selects the radio button 905, the setting unit 203 enables the user to press an area setting button 913. Then, in a case where areas are not set, and if the user presses the area setting button 913 and sets areas, the adjustment unit 206 can set the threshold for the likelihoods in all the set areas.

In display regions 907 to 910, thresholds (e.g., 0.005 to 0.01) set in areas 1 to 4, respectively, are indicated. Then, if the user presses the OK button 911, the settings are completed. If, on the other hand, the user presses a cancel button 912, the adjustment unit 206 does not reflect the contents of the settings.

As described above, in the third exemplary embodiment, the user can specify areas and set the threshold for the likelihoods. In the present exemplary embodiment, the user can specify the threshold for the likelihoods appropriate for situations such as a region where incorrect detections are likely to occur, and a region where it is expected that the estimated number of correct detections greatly decreases due to the setting of the threshold. According to the third exemplary embodiment, the user can specify that the threshold be set higher in a region where incorrect detections are likely to occur, and that the threshold be set lower to prevent a decrease in the number of likelihoods corresponding to correct detections in a region where particular objects are dense. As a result, it is possible to improve the counting accuracy.

<Hardware Configuration>

Figure 10:
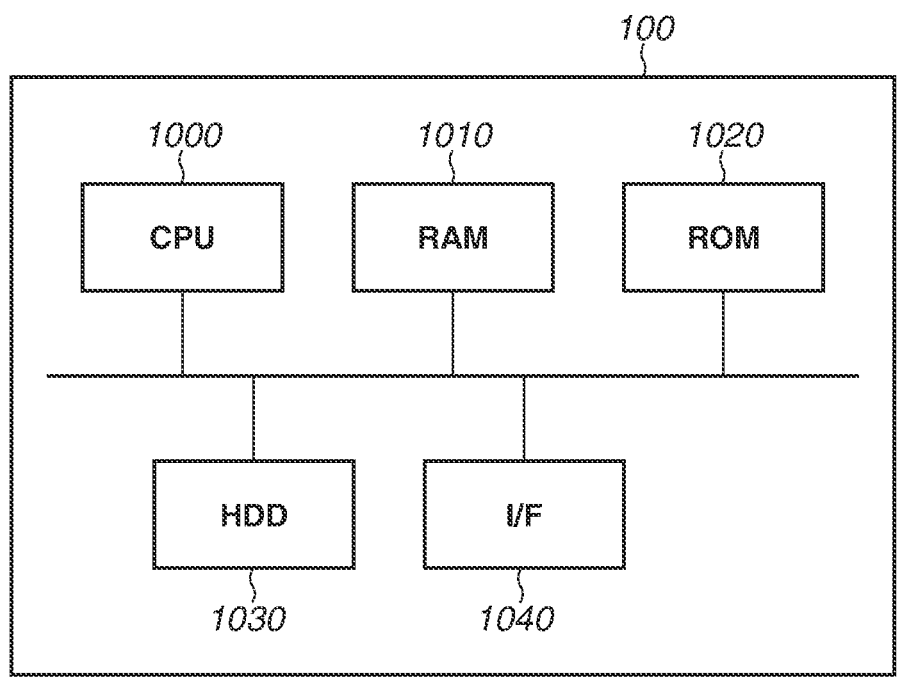
FIG. 10 is a diagram illustrating an example of a hardware configuration of the information processing apparatus.

FIG. 10 is a diagram illustrating an example of a hardware configuration capable of achieving the functions of the information processing apparatus 100 according to each of the first to third exemplary embodiments. Although the hardware configuration of the information processing apparatus 100 is described here, the recording apparatus 120 and the imaging apparatus 110 may also be achieved by similar hardware configurations.

The image processing apparatus 100 according to the present exemplary embodiment at least includes a CPU 1000, a random-access memory (RAM) 1010, a ROM 1020, a hard disk drive (HDD) 1030, and an I/F 1040. The CPU 1000 is a central processing unit that performs overall control of the information processing apparatus 100. The RAM 1010 temporarily stores a computer program executed by the CPU 1000. The RAM 1010 provides a work area used to execute processing by the CPU 1000. For example, the RAM 1010 functions as a frame memory or functions as a buffer memory. The ROM 1020 stores a program for the CPU 1000 to control the information processing apparatus 100. The HDD 1030 is a storage device that records image data. The information processing program according to the present exemplary embodiment is stored in the ROM 1020 or the HDD 1030. The information processing program is loaded into the RAM 1010 and executed by the CPU 1000, thereby achieving the processing of the functional units in FIG. 2. The I/F 1040 communicates with an external apparatus according to the Transmission Control Protocol/Internet Protocol (TCP/IP) or the Hypertext Transfer Protocol (HTTP) via the network 140.

Although the example where the CPU 1000 executes processing has been described in the above exemplary embodiments, at least a part or all of the processing of the CPU 1000 may be performed by dedicated hardware. For example, the process of displaying a GUI or image data on the display 130 may be executed by a graphics processing unit (GPU). The process of reading a program code from the ROM 1020 and loading the program code into the RAM 1010 may be executed by direct memory access (DMA) that functions as a transfer apparatus. The components of the information processing apparatus 100 may be achieved by the hardware illustrated in FIG. 10, or can also be achieved by software.

Other Exemplary Embodiments

While the exemplary embodiments have been described above, the present disclosure is not limited to these exemplary embodiments, and can be modified and changed in various ways within the scope of the present disclosure.

Another apparatus may have the one or more functions of the information processing apparatus 100 according to each of the above exemplary embodiments. For example, the imaging apparatus 110 may have the one or more functions of the information processing apparatus 100 according to each of the exemplary embodiments. The above exemplary embodiments may be carried out in any combination.

The present disclosure can also be achieved by the process of supplying a program for achieving one or more functions of the above exemplary embodiments to a system or an apparatus via a network or a storage medium, and of causing one or more processors of a computer of the system or the apparatus to read and execute the program. The present disclosure can also be achieved by a circuit (e.g., an application-specific integrated circuit (ASIC)) for achieving the one or more functions.

All the above exemplary embodiments merely illustrate specific examples for carrying out the present disclosure, and the technical scope of the present disclosure should not be interpreted in a limited manner based on these exemplary embodiments.

That is, the present disclosure can be carried out in various ways without departing from the technical idea or the main feature of the present disclosure.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-020679, filed Feb. 12, 2021, which is hereby incorporated by reference herein in its entirety.

What is claimed is:

1. An information processing apparatus comprising:
one or more memories storing instructions; and
one or more processors that, upon execution of the stored instructions, are configured to:
acquire, from each of a plurality of partial regions obtained by dividing an input image, likelihood information indicating a likelihood indicating certainty of presence of a particular object;
determine, based on the likelihood information, a region where the likelihood is greater than or equal to a first predetermined value among the plurality of partial regions, as a region where a threshold is to be adjusted to be lower; and
estimate a number of particular objects by counting the likelihood with respect to each of the partial regions by excluding a likelihood less than the threshold among the likelihoods included in the partial regions from counting targets.

2. The information processing apparatus according to claim 1, wherein determines a region where there are a certain number or more of likelihoods greater than a second predetermined value among the likelihoods included in the partial regions is determined, as a region where the threshold in the partial regions is to be adjusted to be lower.

3. The information processing apparatus according to claim 1, wherein the one or more processors are further configured to generate a plurality of partial regions from the input image.

4. The information processing apparatus according to claim 3,
wherein based on the likelihood information, the one or more processors generates a partial region of interest from the input image, and
wherein based on the likelihood information included in the partial region of interest, the one or more processors determines a region where the threshold is to be adjusted.

5. The information processing apparatus according to claim 4,
wherein based on the likelihood information, the one or more processors generates any of the partial regions where the number of the likelihoods is greater than a predetermined number, as the partial region of interest, and
wherein the one or more processors determine the partial region of interest as a region where the threshold is to be adjusted to be lower.

6. The information processing apparatus according to claim 4,
wherein based on the likelihood information, the one or more processors generates a region included in a predetermined range about a likelihood greater than or equal to a predetermined value included in the partial regions, as the partial region of interest, and
wherein the one or more processors determine the partial region of interest as a region where the threshold is to be adjusted to be lower.

7. The information processing apparatus according to claim 3, wherein in a case where the likelihood information changes between frames of a moving image, the one or more processors update the partial regions.

8. The information processing apparatus according to claim 3, wherein the partial regions are generated according to an instruction from a user.

9. The information processing apparatus according to claim 1,
wherein the likelihood information is acquired as a result of inputting the input image to a trained model that estimates positions of the particular objects, and
wherein the trained model outputs the likelihood information regarding each of the plurality of partial regions.

10. The information processing apparatus according to claim 1, wherein the one or more processors are further configured to set a predetermined threshold with respect to each of the plurality of partial regions, wherein in a case where there are a certain number or more of likelihoods greater than or equal to a predetermined value in the partial region, the one or more processors determines the partial region as a region where the threshold is to be adjusted to be lower than the predetermined threshold.

11. The information processing apparatus according to claim 1, wherein according to the number of likelihoods greater than or equal to a predetermined value that are included in each of the partial regions, the one or more processors determine the threshold.

12. The information processing apparatus according to claim 1, wherein the one or more processors adjust the threshold in any of the partial regions where there is not a likelihood greater than or equal to a predetermined value, to be higher than the threshold in any of the partial regions where there is a likelihood greater than or equal to the predetermined value.

13. The information processing apparatus according to claim 12, wherein according to an instruction to make an automatic determination from a user or an indication of a threshold from the user, the one or more processors set the threshold with respect to each of the partial regions.

14. The information processing apparatus according to claim 1, wherein the particular objects are people, and wherein the one or more processors estimate the number of people included in the input image.

15. The information processing apparatus according to claim 1, wherein the one or more processors estimate a sum total value of likelihoods included in the likelihood information, each of which is greater than the threshold, as the number of the particular objects.

16. An information processing method comprising:

acquiring, from each of a plurality of partial regions obtained by dividing an input image, likelihood information indicating a likelihood indicating certainty of presence of a particular object;

based on the likelihood information, determining a region where the likelihood is greater than or equal to a first predetermined value among the plurality of partial regions, as a region where a threshold is to be adjusted to be lower; and estimating a number of particular objects by counting the likelihood with respect to each of the partial regions by excluding a likelihood less than the threshold among the likelihoods included in the partial regions from counting targets.

17. A non-transitory computer-readable storage medium storing a program for causing a computer to execute an information processing method comprising:

acquiring, from each of a plurality of partial regions obtained by dividing an input image, likelihood information indicating a likelihood indicating certainty of presence of a particular object;

based on the likelihood information, determining a region where the likelihood is greater than or equal to a first predetermined value among the plurality of partial regions, as a region where a threshold is to be adjusted to be lower; and estimating a number of particular objects by counting the likelihood with respect to each of the partial regions by excluding a likelihood less than the threshold among the likelihoods included in the partial regions from counting targets.

\* \* \* \* \*